Patented Dec. 2, 1930

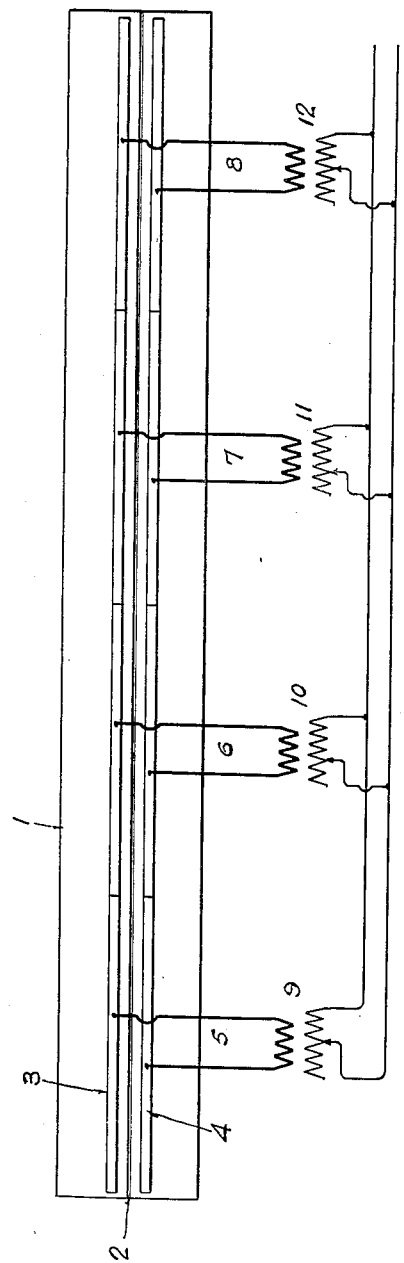

1,783,411

UNITED STATES PATENT OFFICE

WILLIAM E. CRAWFORD, OF WAUWATOSA, WISCONSIN, ASSIGNOR TO A. O. SMITH CORPORATION, OF MILWAUKEE, WISCONSIN, A CORPORATION OF NEW YORK

METHOD OF ELECTRICALLY WELDING TUBULAR ARTICLES

Application filed May 8, 1929. Serial No. 361,433.

This invention relates to a method of electrically welding tubular articles and has particular application in the flash or resistance welding of tubular articles of a length wherein the welding current is distributed along the seam to be welded at a plurality of regions, as set forth in the co-pending application, Serial No. 335,700, filed on January 28, 1929, by the present inventor.

In the welding of a single longitudinal seam of a tubular article by the passage of the welding current across the edges to be welded, and with the current conducting clamps or electrodes contacting with the work adjacent the edges to be joined, it has been found that the current divides itself into two paths, one around the back of the tube and the other across the seam, and that, whether a magnetic flux carrying member is inserted in the pipe to oppose such back leakage or whether such member is omitted, there is a materially greater back leakage of current at the ends of the pipe than in the center. This excess of back leakage at the ends of the work makes it difficult to heat the edges to be welded uniformly throughout the full length of the article.

In application Serial No. 361,432, filed on even date herewith by the present inventor, means are set forth for preventing this uneven back leakage of current.

The present invention has for its object the overcoming of the detrimental effects of such non-uniform back leakage of current on the welding operation.

Another object is to provide means for heating the edges uniformly and simultaneously throughout the length of the article.

The invention is applicable to welding of the longitudinal seams in forming tubular articles or pipe sections where the seam may be several feet in length; and the invention is particularly useful in the welding of such longitudinal seams where the length approaches 20 to 40 feet. The usefulness of the invention is not limited, however, to any particular length or lengths, and applies to any and all single seam welding in the forming of tubular articles where it is found to be desirable or necessary to distribute the welding current to the work by a plurality of current supplying leads.

The accompanying drawing illustrates an embodiment of the invention and shows a plan view of the apparatus.

The pipe may be formed from a flat sheet of metal which is converted into a tubular blank 1 having a single longitudinal seam 2 to be welded. The welding current is applied to the seam 2 through electrodes 3 and 4 arranged on opposite sides of the seam. These electrodes may be continuous along the seam or may be sectional and the welding current is preferably distributed thereto through a plurality of pairs of leads 5, 6, 7 and 8. These leads preferably comprise the respective secondaries of a plurality of transformers 9, 10, 11 and 12. The primaries of these transformers are preferably energized from a common source of welding current.

In order to prevent detrimental effect upon the welding operation due to the non-uniform back leakage of current, the present invention employs a higher initial voltage at the ends of the pipe than in the center. This may be done by adjusting the transformers 9 and 12 differently from the transformers 10 and 11 so that the voltage applied by the same differs sufficiently to force the same amount of heating current across the edges at the ends of the pipe as is forced across the edges in the center. In this way the edges may be heated uniformly and simultaneously for the full common length thereof irrespective of differences in the back leakage in the pipe.

I claim:

1. The method of electrically welding a single longitudinal seam to form a tubular article, which comprises distributing the welding current along the edges to be welded and employing a higher initial voltage at the ends of the work than in the center to thereby effect a uniform and simultanenous heating of the edges to welding temperature, and pressing the edges together to weld the same throughout the length thereof.

2. The method of electrically welding a single longitudinal seam to form a tubular article, which comprises distributing the welding current along the edges to be welded and impressing a higher initial voltage on the work at the ends thereof commensurate with the increased back leakage current at these areas and such that the working voltage will be substantially uniform throughout the length of the work during the welding operation to thereby simultaneously heat the entire length of the edges of the work at the seam to welding temperature and thereafter pressing the edges together to weld the same throughout the length thereof.

3. The method of electrically welding a single longitudinal seam to form a tubular article, which comprises feeding the welding current from a plurality of spaced transformers arranged in parallel and with their secondaries connected to the work at spaced intervals so as to distribute the welding current along the edges to be welded, and employing such higher initial voltages at the ends than in the center of the work as will compensate for increased back leakage current in the vicinity of the ends to thereby simultaneously heat the entire length of the edges of the work at the seam to welding temperature, and thereafter pressing the edges together to weld the same throughout the length thereof.

In witness whereof I have signed my name at Milwaukee, Wisconsin, this 6th day of May, 1929.

WILLIAM E. CRAWFORD.